Dec. 24, 1968     R. W. BOZEMAN     3,418,443

MAGNETICALLY RESPONSIVE CONTROL APPARATUS

Filed Feb. 19, 1965     2 Sheets-Sheet 1

INVENTOR.
RICHARD W. BOZEMAN
BY David M. Schiller
ATTORNEY

INVENTOR.
RICHARD W. BOZEMAN
BY David M. Schiller
ATTORNEY

United States Patent Office 3,418,443
Patented Dec. 24, 1968

1

3,418,443
MAGNETICALLY RESPONSIVE CONTROL
APPARATUS
Richard W. Bozeman, Bloomington, Ill., assignor to General Electric Company, a corporation of New York
Filed Feb. 19, 1965, Ser. No. 434,082
10 Claims. (Cl. 219—110)

ABSTRACT OF THE DISCLOSURE

Welding control apparatus for monitoring current flow in a conductor and for terminating the current flow if the current magnitude exceeds a predetermined value. As the welding current flows through the current conductors and electrodes, a magnetic field is created. Reed switches, responsive to this magnetic field, will be triggered when the current flow becomes excessive. Upon such triggering, the relay circuit is closed and the relay moves the normally closed contacts to an open position thus terminating the flow of welding current. The reed switches are mounted to permit adjustment of the trip point at which they will close the circuit.

---

In many installations it is very desirable to make provision for monitoring current and for terminating the current when it exceeds a predetermined value. Such is desirable for example, in welding installations which include supply circuits which supply unidirectional welding current from a plurality of semiconductor rectifiers. A supply circuit of this character is disclosed in application Ser. No. 418,217, filed on Dec. 14, 1964, by Richard W. Bozeman and assigned to the assignee of the present invention. In the circuit of this application welding current is derived from three transformers having delta connected primary windings energized from a source of alternating voltage, and having Y connected secondary windings connected to a plurality of semiconductor rectifiers which in turn supply direct current through secondary conductors to the electrodes. The magnitude of current flowing in the secondary conductors which are connected to the electrodes is the same as that flowing through the rectifiers and is primarily a function of the resistance of the workpiece between the electrodes. In order to protect the rectifiers against possible damage from excessive currents which may result especially during the welding of low resistance workpieces, it is necessary to monitor the welding current and to effect rapid termination thereof if a certain maximum current value is exceeded. Previous arrangements for providing such protection have not been entirely satisfactory due to their high cost, bulky construction and also because of their unreliable and relatively slow operation.

OBJECTS OF THE INVENTION

It is therefore an object of the present invention to provide a novel and improved control apparatus of low cost, compact and reliable construction for monitoring current and terminating the current if it exceeds a predetermined maximum value.

It is another object of the invention to provide a novel and improved control apparatus of low cost and reliable construction including magnetically responsive switch means for monitoring a flow of current and very quickly terminating the flow of current if the current exceeds a predetermined maximum value.

It is a further object of the invention to provide novel and improved control apparatus including switch means responsive to magnetic flux established by a flow of current for rapidly terminating the flow of current in the event the current exceeds a predetermined maximum value.

It is still another object of the invention to provide novel and improved welding apparatus including conductor means connected to welding electrodes and protective means including magnetic reed switch means in the vicinity of the conductor means to respond to magnetic flux established by welding current to terminate the welding current if it exceeds a predetermined magnitude.

It is a still further object of the invention to provide apparatus as defined in the preceding object including a pair of reed switches having different trip points and selectively operable in accord with the setting of a weld time selection switch.

SUMMARY OF THE INVENTION

In carrying out the invention in one form the control apparatus is associated with a welding machine including a pair of welding electrodes supplied with current through conductor means from a current supply source which includes a plurality of semiconductor rectifiers. The control apparatus is designed to protect the rectifiers against excessive currents and for this purpose includes magnetically responsive switch means preferably in the form of magnetic reed switch means positioned to respond to magnetic flux established by welding current flowing in the conductor means. A control relay is connected for energization in response to closure of the reed switch means to effect termination of the welding current. The reed switch means is preferably adjustably mounted relative to the conductor means to permit variation of its trip point which is the value of welding current effective to close the reed switch means. Conventional welders include a manually settable weld time selection switch for preselecting the time of weld current flow over a predetermined time range. In the present invention the control apparatus includes a pair of reed switches having different trip points interconnected with the selection switch and the control relay so that the reed switch with the higher trip point is connected to operate the control relay for short time settings of the selection switch, and the reed switch with the lower trip point is connected to operate the control relay for longer time settings of the selection switch.

Other objects and advantages of the invention will become apparent from the following description taken in conjunction with the accompanying drawing in which:

DESCRIPTION OF A PREFERRED EMBODIMENT

Figure 1:
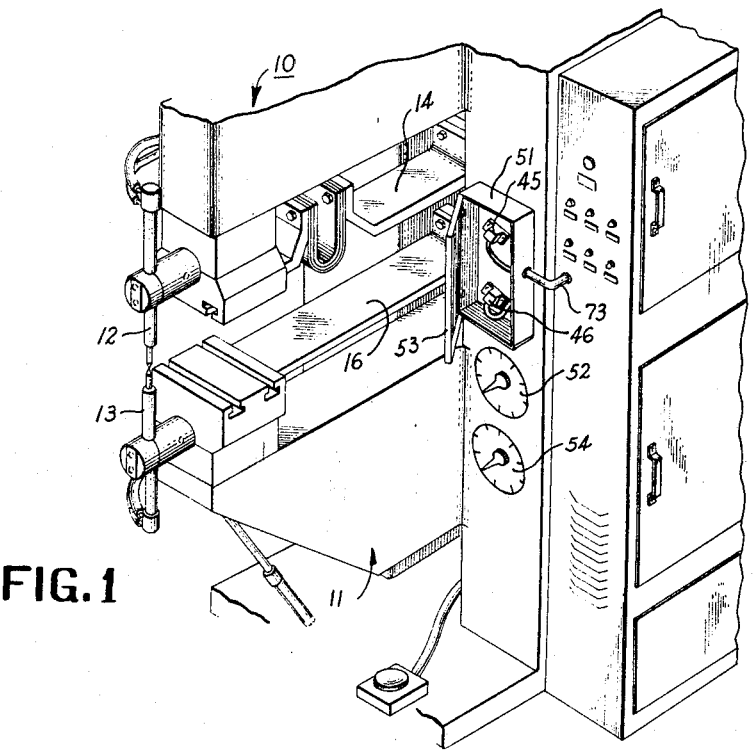
FIG. 1 is a view in perspective showing part of the welding apparatus with which the control apparatus of the invention is employed.

Referring now to the drawing there is illustrated in FIG. 1 a welding machine represented generally by the numeral 10 and incorporating the control apparatus of the present invention. The welder 10 is of conventional construction including a supporting frame 11 and a pair of electrodes 12 and 13 between which a workpiece (not shown) is to be positioned. Conventionally, the electrode 12 is vertically adjustable relative to the electrode 13, and the electrodes are supplied with welding current through conductor means shown in the form of a pair of generally parallel spaced strap conductors 14 and 16 which are connected to the electrodes and to a current supply circuit (not shown). The supply circuit may be of the type disclosed in the aforementioned Bozeman application which circuit includes three transformers having their primary windings connected in a delta configuration for energization from a suitable source of alternating voltage. The transformer secondaries are connected in a Y configuration and supply secondary currents to a plurality of silicon rectifiers which in turn produce direct current which is supplied to the conductors 14 and 16.

In order to prevent possible damage to the rectifiers from excessive currents therethrough, the present invention provides control apparatus for monitoring the rectifier output current traversing the conductors 14 and 16 and for terminating such current in the event that it exceeds a predetermined maximum value. This assures that the rectifier curents are limited to safe values as determined by the current ratings of the rectifiers. The control apparatus in accord with the invention includes magnetically response switch means positioned relative to one of the conductors 14 and 16 for response to magnetic flux established by current traversing such conductor. Suitable control means such as a conventional relay, is connected for energization in response to closure of the magnetic switch means to effect termination of the welding current.

Figure 2:
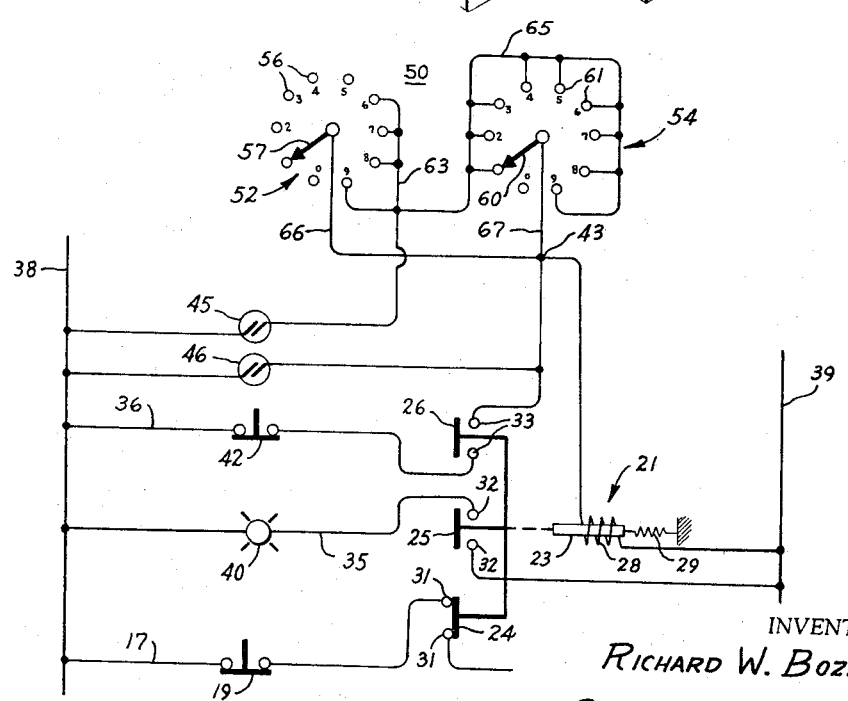
FIG. 2 is a circuit diagram illustrating the control circuits of the apparatus of the present invention.

Referring now to FIG. 2 there is illustrated a preferred form of the control circuits of the apparatus of the present invention including a circuit 17 shown only partially and containing a conventional weld-no-weld switch 19 actuatable for controlling the supply of welding current to the electrodes. Details of the circuit 17 are well known to those skilled in the art and will not be described further. Suffice it to say that when the switch 19 is in its closed position illustrated, welding current is permitted to flow during the appropriate time within the welding sequence, and when the switch 19 is open, the flow of welding current is prevented. In order to interrupt the circuit 17 to terminate the flow of welding current if such becomes excessive, the control apparatus of the present invention includes suitable control means shown by way of example as a conventional electroresponsive relay 21 which is conveniently employed also to control additional circuits. The relay 21 is diagrammatically illustrated in FIG. 2 and includes a magnetic plunger 23 having mechanically connected thereto a plurality of movable contacts 24, 25 and 26 for movement as a unit in response to movement of the plunger. An energizable coil 28 surrounds the plunger 23 and is effective when energized to move the plunger toward the right as viewed in FIG. 2 against the bias of a spring 29. The movable contacts 24, 25 and 26 cooperate respectively with pairs of spaced fixed contacts 31, 32 and 33 included respectively in the circuit 17 and in circuits 35 and 36 forming part of the control apparatus. The circuit 35 is connected across a suitable source of voltage represented by the conductors 38 and 39 and includes an indicating lamp 40 in series with the fixed contacts 32. The conductors 38 and 39 may have either direct or alternating voltage applied thereto. The circuit 36 includes in series the fixed contacts 33 and a normally closed reset switch 42. The circuit 36 is connected at the terminal 43 to the coil 28 of relay 21 and coil 28, fixed contacts 33 and reset switch 42 are connected in series across the conductors 38 and 39. The relay 21 is shown in FIG. 2 in a deenergized condition with the fixed contacts 32 and 33 normally open and the fixed contacts 31 normally closed. Therefore, the lamp circuit 35 and the reset circuit 36 are normally interrupted and the circuit 17 is conditioned to supply welding current when the switch 19 is closed as illustrated. The three sets of cooperating movable and fixed contacts form three control switches which are operated in response to energization of operating means comprising the coil 28.

In order to control energization of relay 21 the invention provides magnetically responsive switch means preferably in the form of a pair of switches 45 and 46 each including a magnetic reed switch. Although magnetic reed switches are preferred for use in the apparatus of the present invention, it is understood that any type of magnetically responsive switch may be used having contacts which close in the presence of an external magnetic field. Each of the reed switches may be of the type disclosed in Patent 2,289,830 which conventionally includes a sealed glass housing containing a pair of elongated, overlapping magnetic reed contacts which are normally open and which have terminals outside the housing. The reed contacts are closed in the presence of a magnetic flux component of predetermined strength directed along the length of the contacts. In the illustrated embodiment, the switches 45 and 46 each includes a non-magnetic housing enclosing the associated reed switch and the reed switches are connected in the circuit of FIG. 2 in a manner described hereinafter to control energization of the coil 28 of relay 21. In the present invention the switches 45 and 46 are positioned in the vicinity of one of the conductors 14 and 16 to respond to magnetic flux established by welding current flowing through the conductor. Inasmuch as the conductors 14 and 16 are series connected, the same current flows therethrough and it is therefore immaterial with which conductor the switches 45 and 46 are associated. For purpose of discussion it will be assumed that the switches 45 and 46 are positioned in the vicinity of the conductor 14. The switches 45 and 46 may be mounted in any convenient location just so long as they are within the influence of magnetic flux emanating from the conductor 14. As shown in FIG. 1, the switches 45 and 46 are mounted on a vertical section of the frame 11 and may be contained within a suitable non-magnetic box 51 which is generally laterally displaced from the conductor 14 and which may be attached to the frame in any suitable manner. The box 51 has a cover 53 which when open, exposes for view and for adjustment the switches therein and which when closed, conceals the switches.

According to another feature of the invention over-current protection is provided for different maximum values of welding current depending upon the length of time selected for the current flow. The magnitude of welding current is dependent primarily upon the resistance of the workpiece and since the resistance of various workpieces differs widely, the welding machine will be called upon to supply welding curents of varying magnitudes. The maximum permissible current output of a semiconductor rectifier depends in part on the length of time such output current flows. Therefore, in accord with the invention the two switches 45 and 46 are arranged to respond to different magnitudes of welding current, and are selectively connected in circuit with the relay 21 under control of weld time selection switch means conventionally employed in welding apparatus.

The weld time selection switch means is diagrammatically illustrated in FIG. 2 and is represented generally by the reference numeral 50. The switch means 50 allows preselection of the time during which weld current flows over a considerable time range. The various circuits associated with the switch means 50 for accomplishing the time preselection are not illustrated since such circuits form no part of the present invention and are well understood by those skilled in the art. The switch means 50 preferably comprises two separate manually settable switches 52 and 54 whch may be designated respectively as a units switch and a tens switch. The units switch 52 is diagrammatically shown as including a circular array of ten spaced contacts 56 adapted for selective engagement by a manually rotatable electroconductive pointer 57 to thereby preselect a certain weld current flow time as indicated by the small numerals 0–9 which are adjacent the contacts 56 and which represent time in number of cycles of the alternating current source energizing the power supply. In a similar manner the tens switch 54 is diagrammatically shown as including a settable pointer 60 adapted for rotation to selectively engage a plurality of spaced contacts 61 arranged in a circular array. The small numbers 0–9 associated with the contacts 61, when multiplied by ten, represent time in number of cycles of the alternating source voltage. With the pointer 57 and 60 set as illustrated to engage the respective contacts 56 and 61 each having the small number 1 associated herewith, welding current will flow for a time period represented by eleven cycles of the alternating voltage source.

In accord with the invention one of the switches 45 and 56 is arranged to operate the relay 21 at a lower value of welding current for longer time settings of the switch means 50, and the other switch is arranged to operate the relay 21 at a higher value of welding current for short time settings of the switch means 50. In the embodiment illustrated, the switch 45 is set to operate at a lower current for example, 25,000 amperes, and is connected through the switch means 50 to coil 28 of relay 21 for any setting of the switch means 50 within the range of six to ninety nine cycles. The switch 46 is set to operate at a higher current, such as 35,000 amperes, and is connected to the coil 28 throughout the entire range of one to ninety-nine cycles. Of course, switch 46 operates only in the range of one to five cycles for which range the switch 45 is disconnected from the circuit. As shown in FIG. 2, one terminal of switch 45 is connected to conductor 38 and the other terminal thereof is connected to a common conductor 63 which interconnects those contacts 56 of switch 52 which have the small numbers 6–9 associated therewith. The common conductor 63 is in turn connected to another common conductor 65 which interconnects those contacts 61 of the switch 54 which have the small numbers 1–9 associated therewith. The pointers 57 and 60 are connected respectively to the terminal 43 by conductors 66 and 67. The terminals of the switch 46 are connected respectively to the conductor 38 and to the terminal 43 so that the switch 46 is connected in parallel with the series arrangement of the fixed contacts 33 and the reset switch 42. With the described arrangement, switch 46 is connected to the coil 28 of relay 21 at all times, but will of course operate only when switch 45 is disconnected from coil 28 because of the higher current response setting of the switch 46. Thus, for a time setting of one to five cycles the relay 21 is controlled by the switch 46, and for any other longer time setting within the range of six to ninety-nine cycles the relay 21 is controlled by the switch 45.

Figure 3:
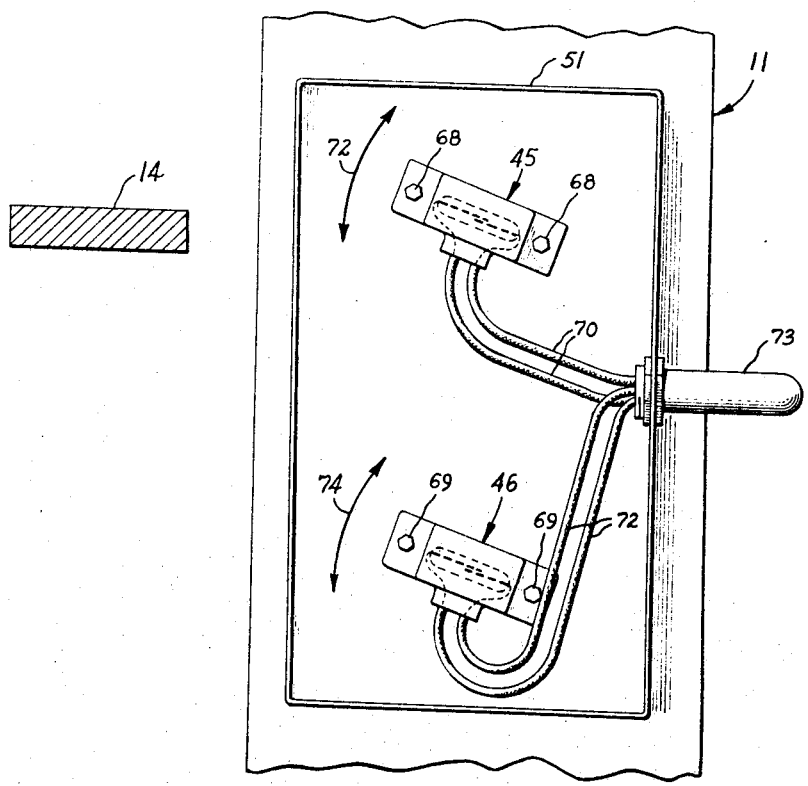
FIG. 3 is a diagrammatic representation illustrating the magnetically responsive switches of the control apparatus and their relation to the conductor means which supply welding current to the electrodes of the welder of FIG. 1.

The value of current at which the reed switches operate to close their contacts is determined by their spacing from the conductor 14 and also by their orientation relative to the conductor 14 about axes perpendicular to the reed switch length dimensions. Referring now to FIG. 3 the switches 45 and 46 are shown mounted so that the switch 45 is closer to the conductor 14 than the switch 46. With this arrangement the switch 45 responds to a current value less than that to which switch 46 responds because for a given current value switch 45 is subjected to a stronger magnetic field than switch 46. Reed switches of the type described herein operate in accord with the strength of the magnetic flux component which traverses the reed contacts along their length. Accordingly, provision is made to allow adjustment of the switches 45 and 46 about axes perpendicular to the reed switch length dimensions to permit variation of the flux component of this character received by the reed switches for a given current value to thereby afford a finer adjustment of the reed switch trip points. It is thus seen that by proper selection of the distance of the switches from the conductor 14 and by proper orientation thereof about axes perpendicular to their lengths, the switches 45 and 46 can be set to operate at current values for example of 25,000 amperes and 35,000 amperes respectively.

In FIG. 3 the switches 45 and 46 are shown mounted to a vertical part of the frame 11 within the box 51 by screws 68 and 69 which extend through end plates of the switch housings and through the base of the box 51 into tapped holes in the frame. Initially, only the screws 68 and 69 at the right hand ends of the switch housings are inserted and these are tightened but to an extent permitting rotation of the switches about the screw axes in the directions of the arrows 72 and 74. When proper adjustment have been made, these screws are fully tightened and the screws 68 and 69 at the left hand ends of the switch housings are then installed. In FIG. 3 the terminals of the reed switches are connected to conductors 70 and 72 which extend through a conduit 73 to the control circuit.

In operation, assume that the switch means 50 is set as illustrated to provide welding current flow for eleven cycles of the alternating voltage source. Assume also that the switch 19 is closed as shown. For these assumptions welding current flows through the conductors 14 and 16 and as long as the magnitude of such current remains below 25,000 amperes, the contacts of the reed switch of switch 45 will not operate. However, if the current value exceeds 25,000 amperes, the contacts of the reed switch of switch 45 close to complete a circuit from the conductor 38 through the closed contacts of switch 45, a part of common conductor 65, the contact 61 with the small numeral 1 associated therewith, pointer 60, conductor 67, and the coil 28 to the conductor 39. Completion of this circuit causes energization of coil 28 and movement of the plunger 23 and the movable contacts 24, 25 and 26 towards the right as viewed in FIG. 2. This results in opening of fixed contacts 31 and termination of welding current, closure of fixed contacts 32 and energization of lamp 40, and closure of fixed contacts 33 and establishment of a sealing circuit through the reset switch 42 to maintain energization of the coil 28 subsequent to opening of the contacts of switch 45 resulting from termination of welding current. Lighting of lamp 40 calls attention to an operator that an excessive current has been detected and the operator can subsequently reset the protective circuit to its initial condition by actuating the reset switch 42 which opens the sealing circuit and deenergizes coil 28.

While the improved control apparatus of the invention has been described in association with a welding machine for monitoring welding current, it is understood that the control apparatus can be employed to monitor current or magnetic flux present in a wide variety of devices and processes, and the application of the control apparatus is by no means limited to welding applications.

Although the invention has been described with reference to certain specific embodiments thereof, numerous modifications are possible and it is desired to cover all modifications falling within the spirit and scope of the invention.

I claim:

1. Welding control apparatus for association with a welding machine having current supply conductors connected to welding electrodes comprising in combination, a weld control switch for controlling flow of welding current to the conductors and electrodes of the machine, a normally closed reset switch, a relay including normally closed contacts in series with said weld control switch, normally open contacts in series with said reset switch, and a coil effective when energized to open said normally closed contacts and to close said normally open contacts, a sealing circuit for said coil including the series arrangement of said normally open contacts of said relay and said reset switch, and a magnetically responsive switch having normally open contacts in series with said coil, and in parallel with the series arrangement of said reset switch and the normally open contacts of said relay, the contacts of said magnetically responsive switch being closed in the presence of a magnetic field of predetermined strength, said magnetic switch to be positioned in the vicinity of a conductor of the machine for response to the magnetic field established by flow of welding current in the conductor, said coil being energized in response to closure of the contacts of said magnetically responsive switch to open said normally closed contacts of said relay to terminate flow of welding current, and to close said normally open contacts of said relay to establish said sealing circuit, said coil being deenergized by opening of said reset switch.

2. Apparatus as defined in claim 1 wherein said magnetically responsive switch includes a sealed magnetic reed switch having a pair of overlapping elongated deflectible magnetic reed contacts.

3. Welding control apparatus for association with a welding machine having current supply conductors connected to welding electrodes comprising in combination, a weld control switch for controlling flow of welding current to the conductors and electrodes of the machine, an indicating lamp, a normally closed reset switch, a relay including normally closed contacts in series with said weld control switch, first normally open contacts in series with said indicating lamp, second normally open contacts in series with said reset switch, and a coil effective when energized to open said normally closed contacts and to close said first and second normally open contacts, a sealing circuit for said coil including the series arrangement of said second normally open contacts of said relay and said reset switch, and a sealed magnetic reed switch having a pair of normally open overlapping elongated deflectible magnetic reed contacts, said reed contacts being in series with said coil, and in parallel with the series arrangement of said reset switch and the second normally open contacts of said relay, said reed contacts being closed in the presence of a magnetic flux component of predetermined strength directed along their length, said reed switch to be positioned in the vicinity of a conductor of the machine for response to the magnetic field established by flow of welding current in the conductor, said coil being energized in response to closure of said reed contacts to open said normally closed contacts of said relay to terminate flow of welding current, to close said first normally open contacts of said relay to energize said lamp, and to close said second normally open contacts of said relay to establish said sealing circuit, said coil being deenergized by opening of said reset switch.

4. Welding control apparatus for association with a welding machine having current supply conductors connected to welding electrodes comprising in combination, a weld control switch for controlling flow of welding current to the conductors and electrodes of the machine, manually settable weld time selection switch means for preselecting the time of weld current flow over a certain time range, a relay including normally closed contacts in series with said weld control switch, and a coil effective when energized to open said contacts, first and second magnetically responsive switches each having normally open contacts, circuit means interconnecting said magnetically responsive switches, said coil and said selection switch means so that said first magnetically responsive switch is connected in series with said coil for settings of said selection switch means within a first time range, and said second magnetically responsive switch is connected in series with said coil for settings of said selection switch means within a second time range, the contacts of said magnetically responsive switches being closed in response to a magnetic field of predetermined strength, said magnetic switches to be positioned in the vicinity of a conductor of the machine for response at different trip points to the magnetic field established by flow of welding current in the conductor.

5. Welding control apparatus for association with a welding machine having current supply conductors connected to welding electrodes comprising in combination, a weld control switch for controlling flow of welding current to the conductors and electrodes of the machine, a normally closed reset switch, manually settable weld time selection switch means for preselecting the time of weld current flow over a certain time range, a relay including normally closed contacts in series with said weld control switch, normally open contacts in series with said reset switch, and a coil effective when energized to open said normally closed contacts and to close said normally open contacts, first and second magnetic reed switches each having a pair of normally open overlapping elongated deflectible magnetic reed contacts, circuit means interconnecting said reed switches, said coil and said selection switch means so that said first reed switch is connected in series with said coil for settings of said selection switch means within a lower time range, and said second reed switch is connected in series with said coil for settings of said selection switch means within a higher time range, the contacts of each reed switch being closed in the presence of a magnetic flux component of predetermined strength directed along their length, said first and second reed switches to be positioned in the vicinity of a conductor of the machine for response respectively at higher and lower trip points to the magnetic field established by flow of welding current in the conductor.

6. Welding apparatus comprising in combination, welding electrodes, current supply conductor means connected to said electrodes, a weld control switch for controlling the flow of welding current through said conductor means and said electrodes, a normally closed additional switch in series with said weld control switch, operating means effective when energized to open said additional switch, and a sealed magnetic reed switch having a pair of normally open elongated overlapping deflectible magnetic reed contacts in series circuit with said operating means, said reed contacts being closed in the presence of a magnetic flux component of predetermined strength directed along their length to effect energization of said operating means, said reed switch being mounted in the vicinity of said conductor means for response to magnetic flux established by welding current in said conductor means, said reed switch being mounted for adjustment relative to said conductor means about an axis perpendicular to the length of the reed contacts to permit variation of the strength of said magnetic flux component for a given welding current value, said operating means being energized in response to closure of said reed contacts to open said additional switch to terminate flow of welding current.

7. Welding apparatus comprising in combination, welding electrodes, current supply conductor means connected to said electrodes, a weld control switch for controlling the flow of welding current through said conductor means and said electrodes, manually settable weld time selection switch means for preselecting the time of weld current flow over a certain time range, a normally closed additional switch in series with said weld control switch, operating means effective when energized to open said additional switch, first and second sealed magnetic reed switches each having a pair of normally open elongated overlapping deflectible magnetic reed contacts, circuit means interconnecting said reed switches, said operating means and said selection switch means so that said first reed switch is connected in circuit with said operating means for settings of said selection switch means within a lower time range, and said second reed switch is connected in circuit with said operating means for settings of said selection switch means within a higher time range, said reed switches being mounted in the vicinity of said conductor means for response to magnetic flux established by welding current in said conductor means, said first reed switch being positioned farther from said conductor means than said second reed switch.

8. Electrical apparatus comprising in combination, a conductor for carrying current to be monitored, a first switch for controlling flow of current in said conductor, a sealed magnetic reed switch having a pair of normally open overlapping deflectible magnetic reed contacts, said reed contacts being closed in the presence of a magnetic flux component of predetermined strength directed along their length, means mounting said reed switch in the vicinity of said conductor for response to the magnetic field established by current in the conductor, said means mounting said reed switch for adjustment relative to said conductor about an axis perpendicular to the length of the reed contacts to permit variation of the strength of said magnetic flux component for a given value of current in said conductor, and a relay including normally closed contacts in series with said first switch, and a coil in series with said reed contacts, said coil being energized in response to closure of said reed contacts to open said normally closed relay contacts to terminate flow of current in said conductor.

9. Apparatus as defined in claim 8 including a sealing circuit for maintaining energization of said coil subsequent to opening of said reed contacts in response to termination of current flow in said conductor, said sealing circuit including a normally closed reset switch and normally open contacts of said relay in series with said coil, said coil being deenergized by opening of said reset switch.

10. Apparatus as defined in claim 8 wherein said reed switch includes a single pair of contacts, said means mounting said reed switch including a frame, a housing containing said reed switch, and a releasable fastener extending through a part of the housing into said frame, said housing being pivotable about the axis of said fastener.

References Cited

UNITED STATES PATENTS

| | | | |
|---|---|---|---|
| 2,206,426 | 7/1940 | Phelps | 219—108 |
| 2,976,395 | 3/1961 | Spencer | 219—108 |

RICHARD M. WOOD, *Primary Examiner.*

P. MAY, *Assistant Examiner.*

U.S. Cl. X.R.

219—86